(12) United States Patent
Sobel et al.

(10) Patent No.: US 10,338,818 B1
(45) Date of Patent: Jul. 2, 2019

(54) SYSTEMS AND METHODS FOR ENABLING SAFE MEMORY DE-DUPLICATION IN SHARED-COMPUTING ENVIRONMENTS

(71) Applicant: Symantec Corporation, Mountain View, CA (US)

(72) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 25 days.

(21) Appl. No.: 15/471,593

(22) Filed: Mar. 28, 2017

(51) Int. Cl.
*G06F 12/00* (2006.01)
*G06F 3/06* (2006.01)
*G06F 9/455* (2018.01)

(52) U.S. Cl.
CPC ............ *G06F 3/0608* (2013.01); *G06F 3/065* (2013.01); *G06F 3/067* (2013.01); *G06F 3/0641* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | | |
|---|---|---|---|---|
| 2013/0290645 A1* | 10/2013 | Van De Ven | ....... | G06F 12/0284 711/147 |
| 2015/0052614 A1* | 2/2015 | Crowell | .................. | G06F 21/53 726/25 |
| 2017/0242811 A1* | 8/2017 | Tsirkin | .................... | G06F 13/28 |

\* cited by examiner

*Primary Examiner* — Jason W Blust
(74) *Attorney, Agent, or Firm* — FisherBroyles, LLP

(57) ABSTRACT

The disclosed computer-implemented method for enabling safe memory de-duplication in shared-computing environments may include (i) identifying a first virtual machine and a second virtual machine, (ii) calculating a trustworthiness score for the first virtual machine based on a trustworthiness score of each binary of the first virtual machine, (iii) calculating a trustworthiness score for the second virtual machine based on a trustworthiness score of each binary of the second virtual machine, and (iv) enabling the first virtual machine and the second virtual machine to share a page frame of physical memory by assigning, based on the trustworthiness scores of the first virtual machine and the second virtual machine being above a predetermined threshold, the first virtual machine and the second virtual machine to a trusted group of virtual machines that can share physical memory. Various other methods, systems, and computer-readable media are also disclosed.

18 Claims, 13 Drawing Sheets

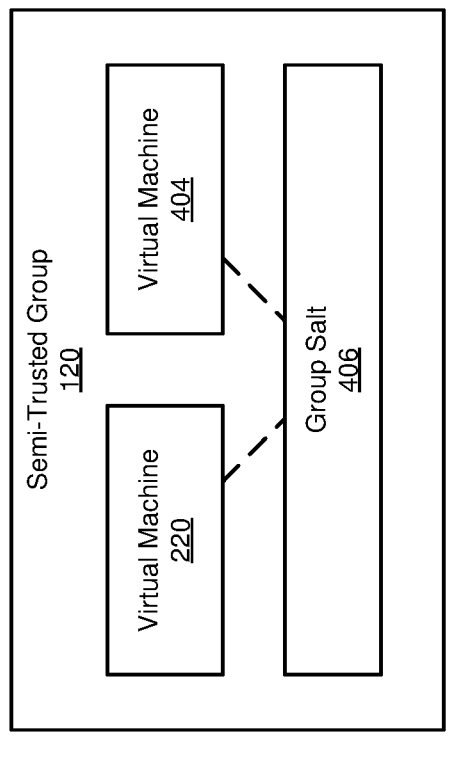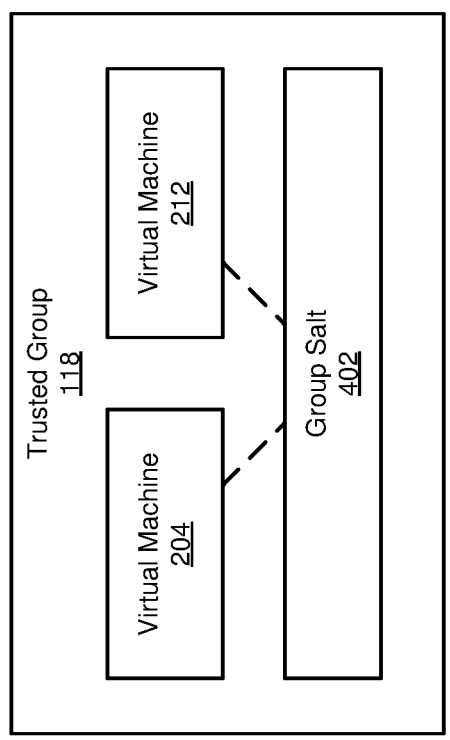
FIG. 4

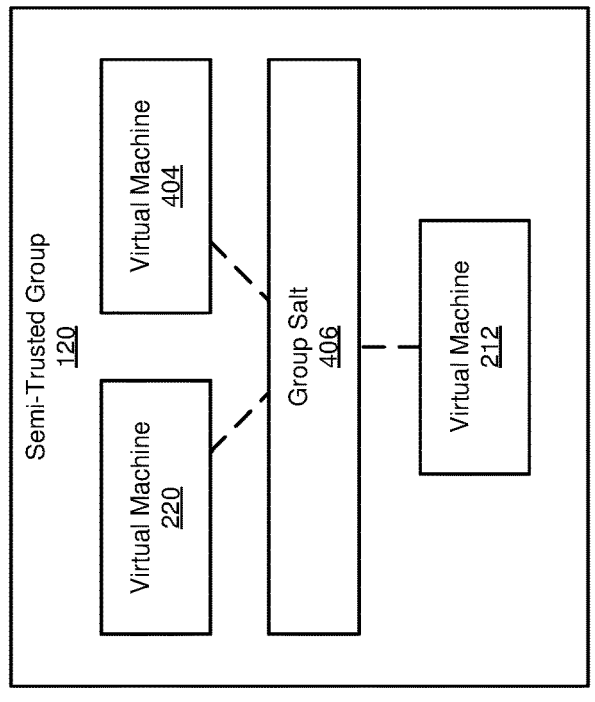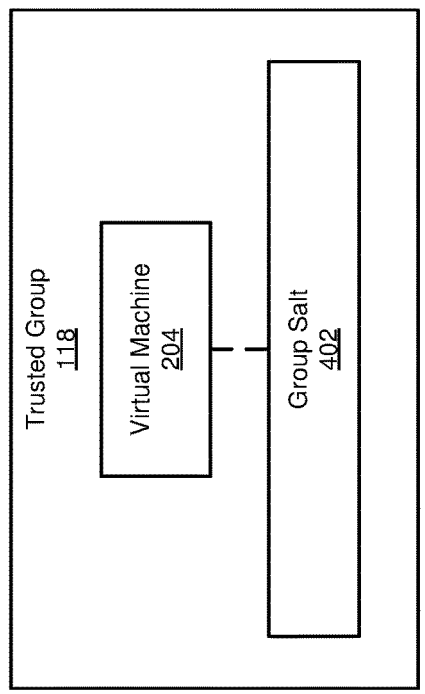
FIG. 6

US 10,338,818 B1

SYSTEMS AND METHODS FOR ENABLING SAFE MEMORY DE-DUPLICATION IN SHARED-COMPUTING ENVIRONMENTS

BACKGROUND

Today, many computational workloads are performed by virtual machines in shared-computing environments (e.g., cloud-computing environments). In typical shared-computing environments, several virtual machines may run in isolation from one another yet use the same physical resources. The sharing of physical resources by virtual machines often results in significant reductions in the amount of physical resources (e.g., physical hardware, rack space, and cooling) that must be allocated to run many conventional computational workloads.

In a typical shared-computing environment, virtual machines may be allocated virtual memory in amounts that exceed the amount of available physical memory (a concept that is often referred to as memory overcommitment). Overcommitment of memory may be possible since (i) a typical virtual machine does not use all the virtual memory that has been allocated to it and (ii) unused virtual memory may not consume physical memory. Overcommitment of memory may also be possible because one or more pages of virtual memory of two or more virtual machines may, in some circumstances, share or be mapped to the same page frame in physical memory.

In many shared-computing environments, virtual machines often execute the same operating systems, run the same applications, and/or process the same data such that one or more pages of virtual memory of the virtual machines may contain identical data. To reduce the amount of physical memory that is used by the virtual machines, some shared-computing environments may monitor physical memory for identical page frames and, when identical page frames are detected, de-duplicate the identical page frames by (i) retaining one of the page frames as read-only memory, (ii) remapping the pages of virtual memory that were mapped to the other page frames to the retained page frame, and (iii) releasing the other page frames. If a virtual machine attempts to write data to a page of virtual memory that is backed by a shared page frame in physical memory, a typical shared-computing environment may use a copy-on-write mechanism that remaps the page of virtual memory to a new duplicate page frame in physical memory before committing the virtual machine's write to physical memory.

Unfortunately, recent discoveries of the Rowhammer dynamic random-access memory (DRAM) bug that plagues some types of physical memory and its associated exploits (e.g., Flip Feng Shui) have caused many shared-computing providers to forgo physical-memory de-duplication. The Rowhammer DRAM bug generally refers to a hardware bug that plagues certain types of DRAM whose row-based configurations are flawed in such a way that repeated read accesses from one physical row of memory may induce bit flips (i.e., single bit errors) in adjacent physical rows of memory. Malicious attacks based on this flaw are often referred to as rowhammer attacks. In conventional shared-computing environments, a malicious virtual machine may use a rowhammer attack to induce a bit flip in a page of virtual memory of a target virtual machine that is mapped to a shared page frame and that contains data that is sensitive to bit flips. The instant disclosure, therefore, identifies and addresses a need for systems and methods for enabling safe memory de-duplication in shared-computing environments.

SUMMARY

As will be described in greater detail below, the instant disclosure describes various systems and methods for enabling safe memory de-duplication in shared-computing environments. In one example, a method for enabling safe memory de-duplication in shared-computing environments may include (i) identifying a first virtual machine and a second virtual machine, (ii) calculating a trustworthiness score for the first virtual machine based on a trustworthiness score of each of a plurality of binaries of the first virtual machine, (iii) calculating a trustworthiness score for the second virtual machine based on a trustworthiness score of each of a plurality of binaries of the second virtual machine, and (iv) enabling a page of virtual memory of the first virtual machine and a page of virtual memory of the second virtual machine to share a page frame of physical memory by (a) assigning, based on the trustworthiness score of the first virtual machine being above a predetermined threshold, the first virtual machine to a trusted group of virtual machines that can share physical memory and (b) assigning, based on the trustworthiness score of the second virtual machine being above the predetermined threshold, the second virtual machine to the trusted group.

In some examples, the method may further include (i) determining that the page of virtual memory of the first virtual machine and the page of virtual memory of the second virtual machine contain identical data, (ii) determining that the first virtual machine and the second virtual machine have been assigned to the trusted group, and (iii) mapping, in response to determining that the first virtual machine and the second virtual machine have been assigned to the trusted group, the page of virtual memory of the first virtual machine and the page of virtual memory of the second virtual machine to the page frame of physical memory.

In some examples, the method may further include (i) identifying a third virtual machine, (ii) calculating a trustworthiness score for the third virtual machine based on a trustworthiness score of each of a plurality of binaries of the third virtual machine, and (iii) preventing a page of virtual memory of the third virtual machine from being mapped to the page frame of physical memory by refraining, based on the trustworthiness score of the third virtual machine being below the predetermined threshold, from assigning the third virtual machine to the trusted group. In at least one example, the method may further include (i) updating, based on a change to the plurality of binaries of the third virtual machine, the trustworthiness score of the third virtual machine, (ii) determining, after updating the trustworthiness score of the third virtual machine, that the trustworthiness score of the third virtual machine has risen above the predetermined threshold, and (iii) enabling virtual memory pages of the third virtual machine to share physical memory with other virtual machines in the trusted group by assigning, based on the trustworthiness score of the third virtual machine being above the predetermined threshold, the third virtual machine to the trusted group. In various examples, the method may further include (i) assigning, based on the trustworthiness score of the third virtual machine being above a second predetermined threshold, the third virtual machine to a semi-trusted group of virtual machines that can share physical memory with other virtual machines in the semi-trusted group and/or (ii) assigning, based on the trustworthiness score of the third virtual machine being below a second predetermined threshold, the third virtual machine to an untrusted group of virtual machines that cannot share physical memory with any other virtual machine.

In some examples, the method may further include (i) updating, based on a change to the plurality of binaries of the first virtual machine, the trustworthiness score of the first virtual machine, (ii) determining, after updating the trustworthiness score of the first virtual machine, that the trustworthiness score of the first virtual machine has fallen below the predetermined threshold, and (iii) preventing the page of virtual memory of the first virtual machine from sharing the page frame of physical memory with any virtual machine in the trusted group by removing, based on the trustworthiness score of the first virtual machine being below the predetermined threshold, the first virtual machine from the trusted group. In at least one example, the method may further include mapping, after removing the first virtual machine from the trusted group, the page of virtual memory of the first virtual machine to a duplicated page frame of physical memory.

In some examples, the method may further include assigning a unique salt value to the trusted group. In such examples, the step of assigning the first virtual machine to the trusted group may include assigning the unique salt value to the first virtual machine to indicate to a hypervisor that the hypervisor can share physical memory between the first virtual machine and any other virtual machine to which the unique salt value has also been assigned, and the step of assigning the second virtual machine to the trusted group may include assigning the unique salt value to the second virtual machine to indicate to the hypervisor that the hypervisor can share physical memory between the second virtual machine and any other virtual machine to which the unique salt value has also been assigned.

In some examples, the first virtual machine and the second virtual machine may belong to the same consumer. In other examples, the first virtual machine and the second virtual machine may belong to different consumers.

In one embodiment, a system for enabling safe memory de-duplication in shared-computing environments may include several modules stored in memory, including (i) an identifying module that identifies a first virtual machine and a second virtual machine, (ii) a calculating module that (a) calculates a trustworthiness score for the first virtual machine based on a trustworthiness score of each of a plurality of binaries of the first virtual machine and (b) calculates a trustworthiness score for the second virtual machine based on a trustworthiness score of each of a plurality of binaries of the second virtual machine, and (iii) an assigning module that enables a page of virtual memory of the first virtual machine and a page of virtual memory of the second virtual machine to share a page frame of physical memory by (a) assigning, based on the trustworthiness score of the first virtual machine being above a predetermined threshold, the first virtual machine to a trusted group of virtual machines that can share physical memory and (b) assigning, based on the trustworthiness score of the second virtual machine being above the predetermined threshold, the second virtual machine to the trusted group. In at least one example, the system may also include at least one physical processor that executes the identifying module, the calculating module, and the assigning module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a first virtual machine and a second virtual machine, (ii) calculate a trustworthiness score for the first virtual machine based on a trustworthiness score of each of a plurality of binaries of the first virtual machine, (iii) calculate a trustworthiness score for the second virtual machine based on a trustworthiness score of each of a plurality of binaries of the second virtual machine, and (iv) enable a page of virtual memory of the first virtual machine and a page of virtual memory of the second virtual machine to share a page frame of physical memory by (a) assigning, based on the trustworthiness score of the first virtual machine being above a predetermined threshold, the first virtual machine to a trusted group of virtual machines that can share physical memory and (b) assigning, based on the trustworthiness score of the second virtual machine being above the predetermined threshold, the second virtual machine to the trusted group.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 4 is a block diagram of example trustworthiness groups.

FIG. 6 is a block diagram of additional example trustworthiness groups.

Figure 1:
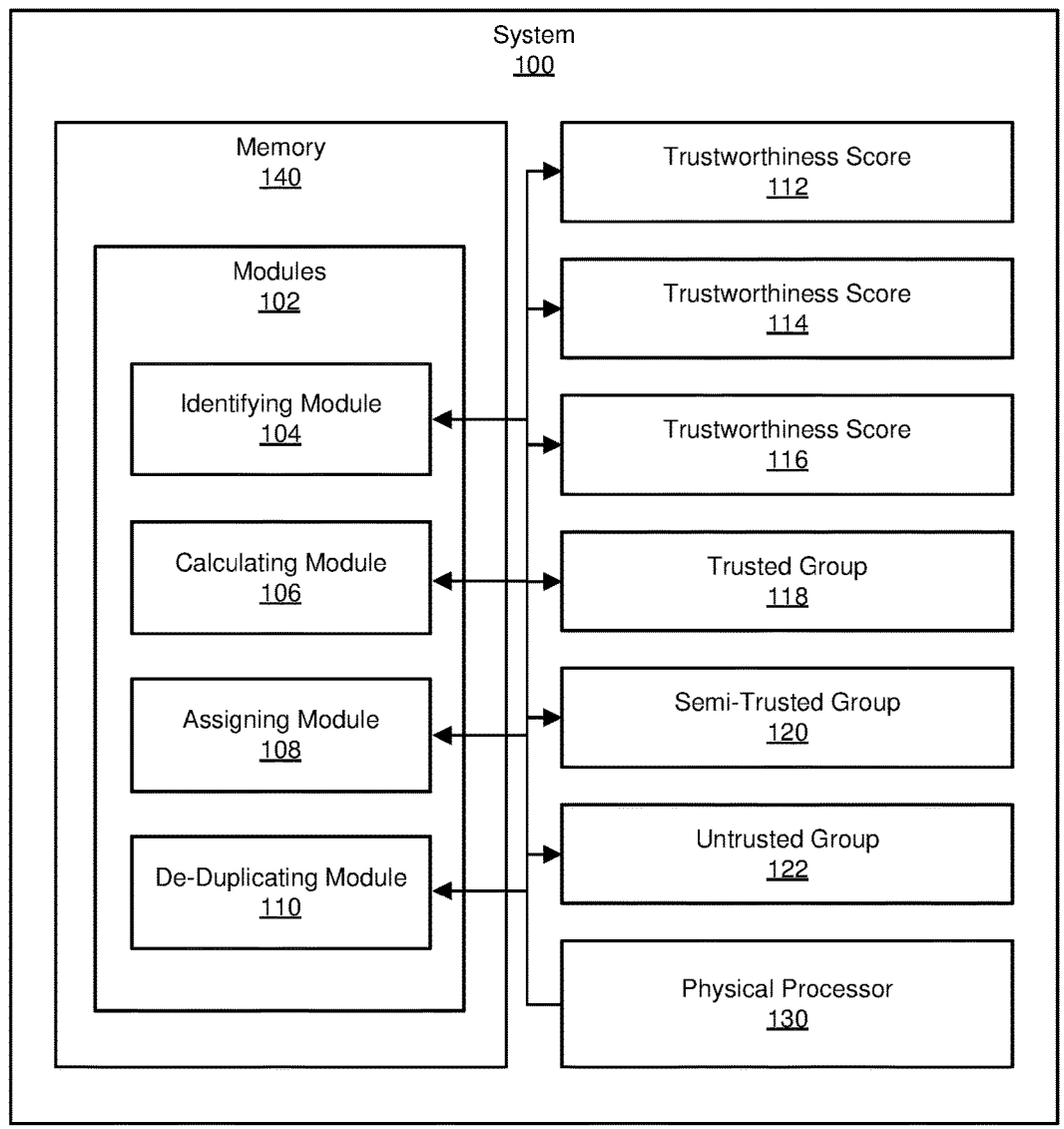
FIG. 1 is a block diagram of an example system for enabling safe memory de-duplication in shared-computing environments.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enabling safe memory de-duplication in shared-computing environments. As will be explained in greater detail below, by determining which virtual machines in shared-computing environments are trustworthy and which are untrustworthy based on the trustworthiness of the virtual machines' binaries, the systems and methods described herein may enable safe memory de-duplication amongst trustworthy virtual machines and/or prevent untrustworthy virtual machines from sharing physical memory with other virtual machines. By enabling trustworthy virtual machines to share physical memory while preventing untrustworthy virtual machines from sharing physical memory with other virtual machines, the systems and methods described herein may prevent the untrusted virtual machines from perpetrating rowhammer attacks.

In addition, the systems and methods described herein may improve the functioning of a computing device (e.g., a hypervisor) by enabling the computing device to safely de-duplicate page frames in physical memory and thus reducing the amount of physical memory that is consumed by the computing device at any given time. These systems and methods may also improve the field of virtualized computing by reducing the amount of physical memory that is needed to safely and securely host trustworthy and/or semi-trustworthy virtual machines in shared-computing environments. Embodiments of the instant disclosure may also provide various other advantages and features, as discussed in greater detail below.

The following will provide, with reference to FIGS. 1-9, detailed descriptions of example systems for enabling safe memory de-duplication in shared-computing environments. Detailed descriptions of corresponding computer-implemented methods will also be provided in connection with FIGS. 10 and 11. In addition, detailed descriptions of an example computing system and network architecture capable of implementing one or more of the embodiments described herein will be provided in connection with FIGS. 12 and 13, respectively.

FIG. 1 is a block diagram of an example system 100 for enabling safe memory de-duplication in shared-computing environments. As illustrated in this figure, example system 100 may include one or more modules 102 for performing one or more tasks. As will be explained in greater detail below, modules 102 may include an identifying module 104, a calculating module 106, an assigning module 108, and a de-duplicating module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enabling safe memory de-duplication in shared-computing environments. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more trustworthiness scores, such as trustworthiness score 112, trustworthiness score 114, and trustworthiness score 116. Additionally, example system 100 may include one or more groups of virtual machines, such as trusted group 118, semi-trusted group 120, and untrusted group 122. Trustworthiness scores 112, 114, and 116 generally represent any type or form of information that conveys the trustworthiness or reputation of a virtual machine. Trusted group 118, semi-trusted group 120, and untrusted group 122 generally represent any type or form of information that identifies virtual machines with the same or similar trustworthiness scores whose physical memory may be shared with one another.

Figure 2:
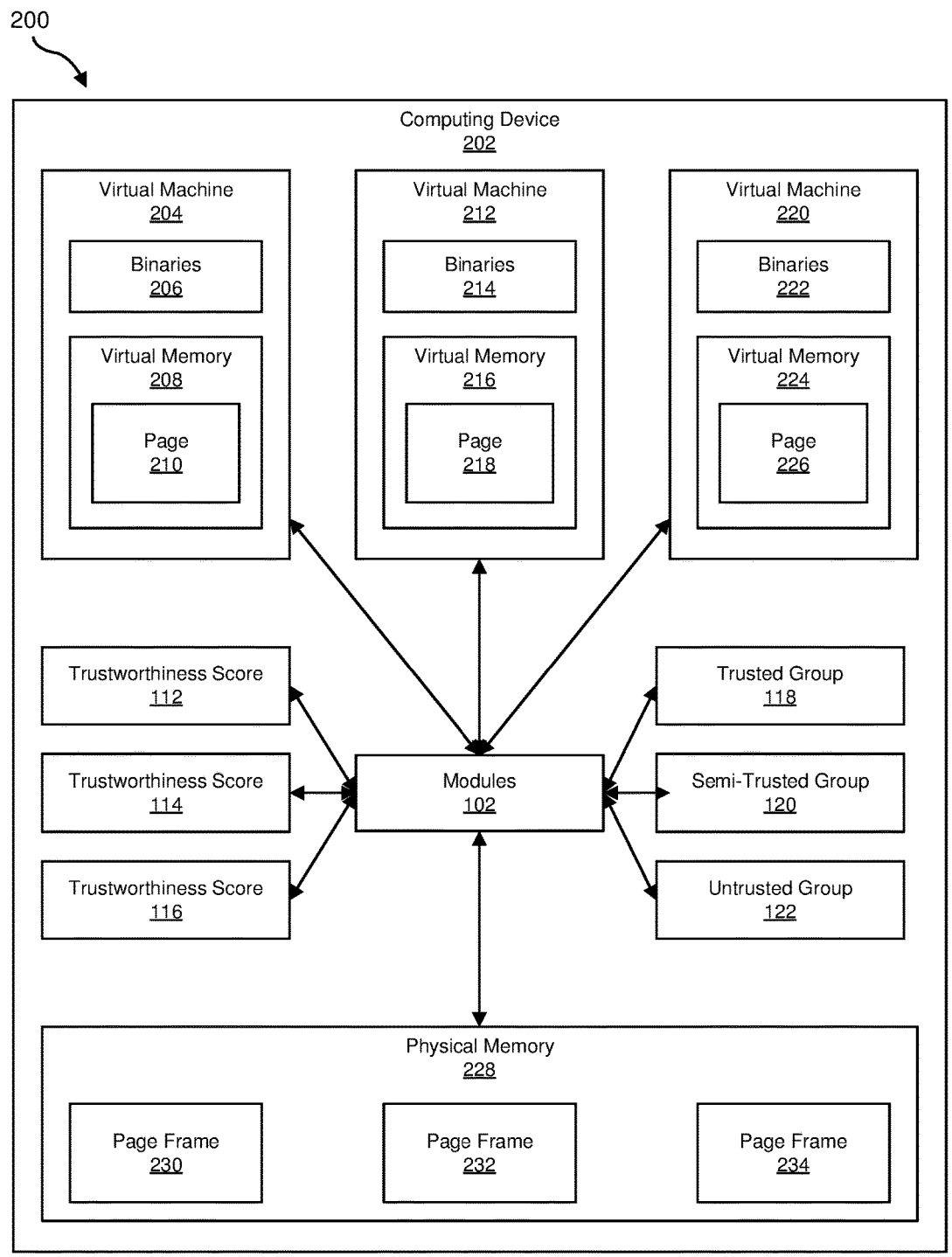
FIG. 2 is a block diagram of an additional example system for enabling safe memory de-duplication in shared-computing environments.
Figure 8:
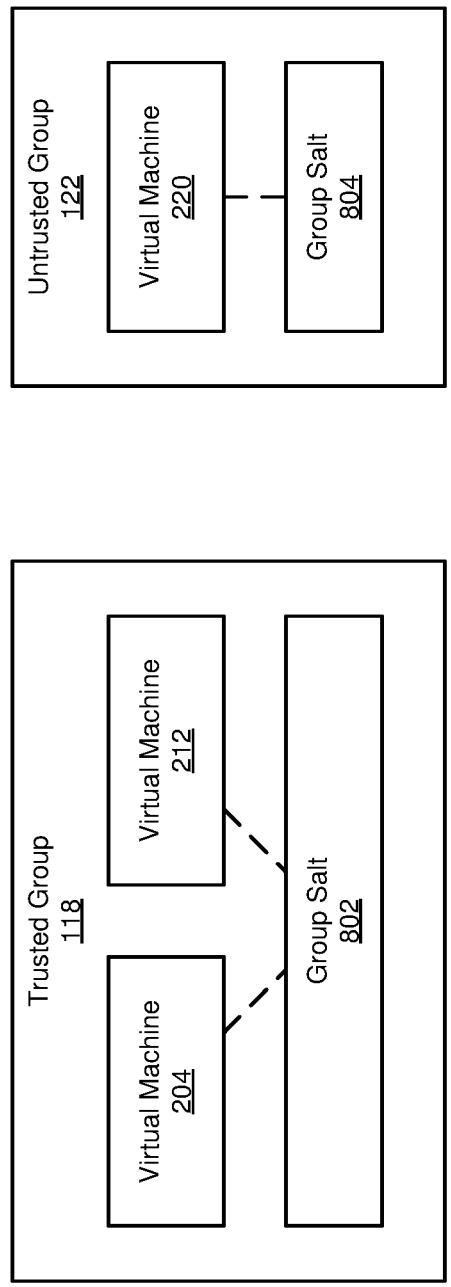
FIG. 8 is a block diagram of additional example trustworthiness groups.

Example system 100 in FIG. 1 may be implemented in a variety of ways. For example, all or a portion of example system 100 may represent portions of example shared-computing system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to safely perform memory de-duplication. For example, and as will be described in greater detail below, one or more of modules 102 may cause computing device 202 to identify a virtual machine 204, a virtual machine 212, and a virtual machine 220. One or more of modules 102 may then cause computing device 202 to (i) calculate a trustworthiness score 112 for virtual machine 204 based on a trustworthiness score of each of binaries 206 of virtual machine 204, (iii) calculate a trustworthiness score 114 for virtual machine 212 based on a trustworthiness score of each of binaries 214 of virtual machine 212, and (iii) calculate a trustworthiness score 116 for virtual machine 220 based on a trustworthiness score of each of binaries 222 of virtual machine 220. One or more of modules 102 may then cause computing device 202 to assign virtual machines 204, 212, and 220 to one of trusted group 118, semi-trusted group 120, or untrusted group 122 based on the respective trustworthiness scores of virtual machines 204, 212, and 220 (e.g., as shown in FIGS. 4, 6, and 8).

Computing device 202 generally represents any type or form of computing device capable of reading computer-executable instructions. In one example, computing device 202 may represent a hypervisor. As used herein, the term "hypervisor" generally refers to any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XENSERVER, any bare-metal hypervisor, and/or any hosted hypervisor. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device on which memory de-duplication may be performed. Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing device 202 may include and/or represent a plurality of computing devices that work and/or operate in conjunction with one another.

As shown in FIG. 2, computing device 202 may be configured to host multiple virtual machines, such as virtual machine 204, virtual machine 212, and virtual machine 220. Virtual machine 204, virtual machine 212, and virtual machine 220 generally represent any virtualization (including hardware-assisted virtualization), implementation, or emulation of a physical computing device. Examples of virtual machine 204, virtual machine 212, and virtual machine 220 include, without limitation, system virtual machines and process virtual machines. In some examples, two or more of virtual machine 204, virtual machine 212, and virtual machine 220 may represent virtual machines that belong to the same consumer of shared-computing system 200. In other examples, two or more of virtual machine 204, virtual machine 212, and virtual machine 220 may represent virtual machines that belong to different consumers.

As shown in FIG. 2, computing device 202 may also include physical memory 228. Physical memory 228 generally represents any type of form of physical computing memory that has the rowhammer DRAM bug or is vulnerable to bit flipping. In some examples, computing device 202 may enable virtual machines to use physical memory 228 by allocating virtual memory (i.e., a virtual address space), which is backed by physical memory 228, for each of the virtual machines that it hosts. For example, computing device 202 may allocate virtual memory 208 for virtual machine 204, virtual memory 216 for virtual machine 212, and virtual memory 224 for virtual machine 220.

Figure 3:
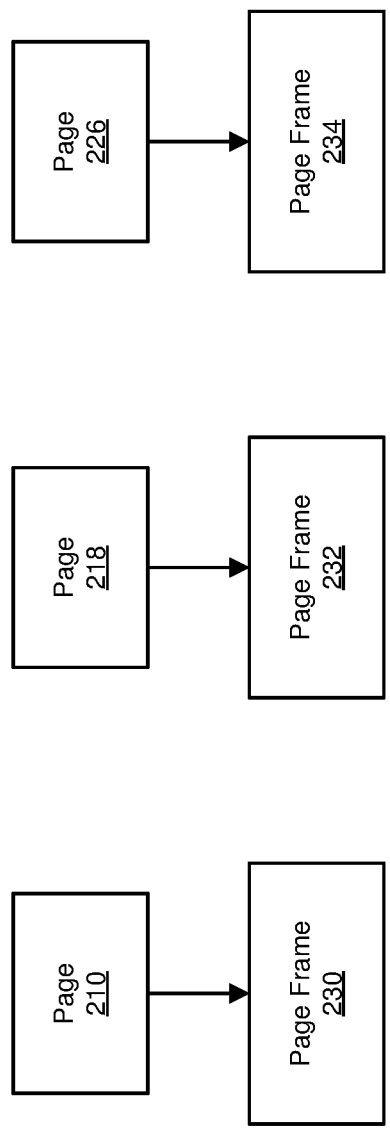
FIG. 3 is a block diagram of an example mapping of virtual memory pages to physical memory.

Computing device 202 may manage the storage of data to virtual memory using pages, such as page 210, page 218, and page 226. As used herein, the terms "page" and "page of virtual memory" generally refer to any contiguous block of virtual memory. A page of virtual memory may be mapped to a page frame of physical memory and may be transferred between physical memory and external page storage when not needed. When a virtual machine reads data from or writes data to a page of virtual memory, computing device 202 may read the data from or write the data to the page frame to which the page of virtual memory has been mapped. The term "page frame" as used herein, generally refers to any contiguous block of physical memory or a unit of storage of physical memory that is used to store a virtual-memory page in active memory. FIG. 3 illustrates how page 210, page 218, and page 226 may be initially mapped to physical memory 228. In this example, page 210 may be stored to page frame 230, page 218 may be stored to page frame 232, and page 226 may be stored to page frame 234.

In some situations, two or more virtual machines may have pages of virtual memory that contain identical data. In the examples described herein, page 210, page 218, and page 226 may contain identical data. In these situations, the page frames of physical memory that store the pages of virtual memory may also store identical data, and computing device 202 may perform memory de-duplication in order to reduce the amount of physical memory that is utilized. As used herein, the term "de-duplication" generally refers to the process of reducing redundant data in physical memory by mapping or backing pages of virtual memory that store identical data to a single page frame in physical memory.

Figure 5:
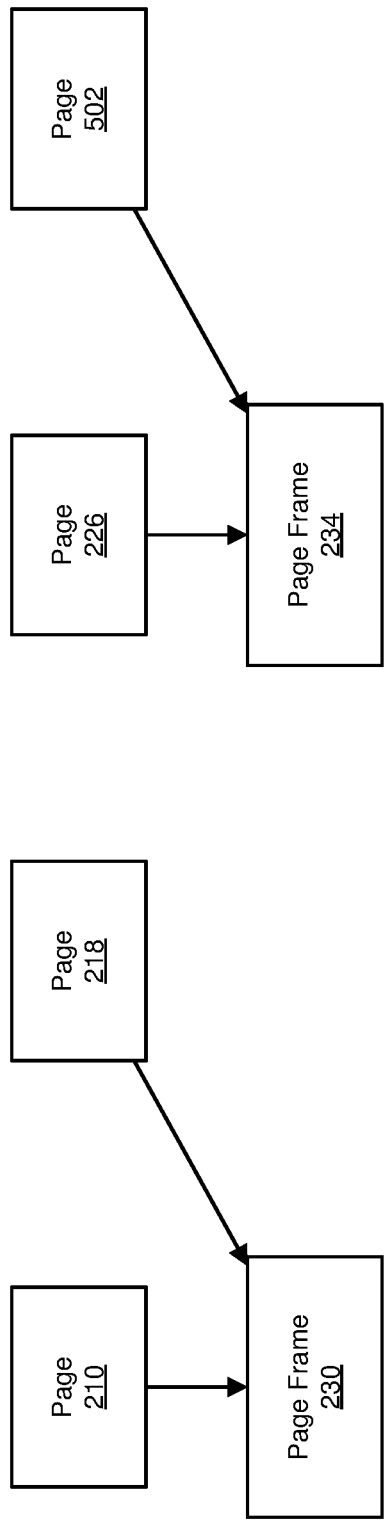
FIG. 5 is a block diagram of an additional example mapping of virtual memory pages to physical memory.
Figure 9:
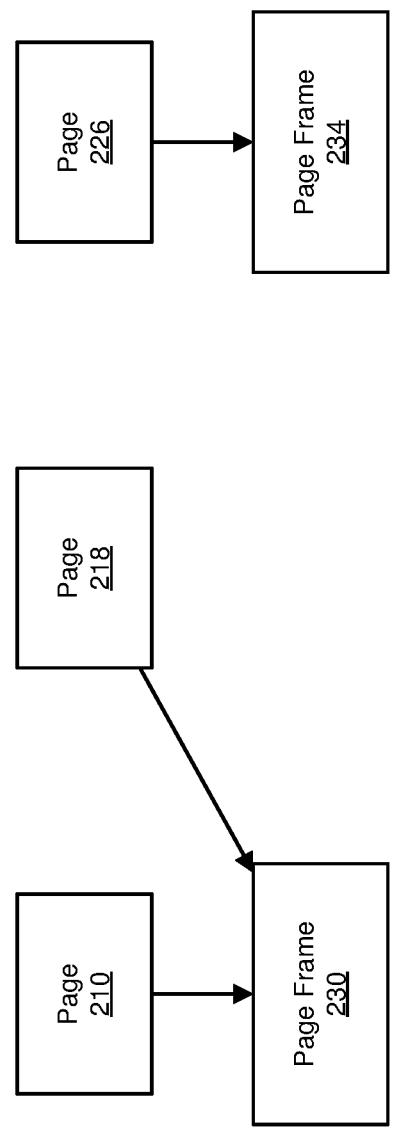
FIG. 9 is a block diagram of an additional example mapping of virtual memory pages to physical memory.

In some examples, computing device 202 may only de-duplicate identical page frames if the page frames belong to virtual machines that are in the same group of trusted or semi-trusted virtual machines. In this way, computing device 202 may ensure that page frames in physical memory are only shared between virtual machines that have the same level of trustworthiness. FIG. 5 illustrates how de-duplicating module 110 may de-duplicate page frames 230, 232, and 234 as shown in FIG. 3 when virtual machines 204, 212, 220, and 404 are assigned to the groups illustrated in FIG. 4. In this example, de-duplicating module 110 may share page frame 230 with virtual machines 204 and 212 by remapping page 218 to page frame 230 since virtual machines 204 and 212 both belong to trusted group 118. De-duplicating module 110 may not share page frame 230 with virtual machines 220 or 404 since virtual machines 220 and 404 do not belong to trusted group 118. Instead, de-duplicating module 110 may share page frame 234 with virtual machines 220 and 404 by remapping page 502 to page frame 234 since virtual machines 220 and 404 both belong to semi-trusted group 120. FIG. 9 illustrates how de-duplicating module 110 may de-duplicate page frames 230, 232, and 230 as shown in FIG. 3 when virtual machines 204, 212, and 220 are assigned to the groups illustrated in FIG. 8.

Figure 7:
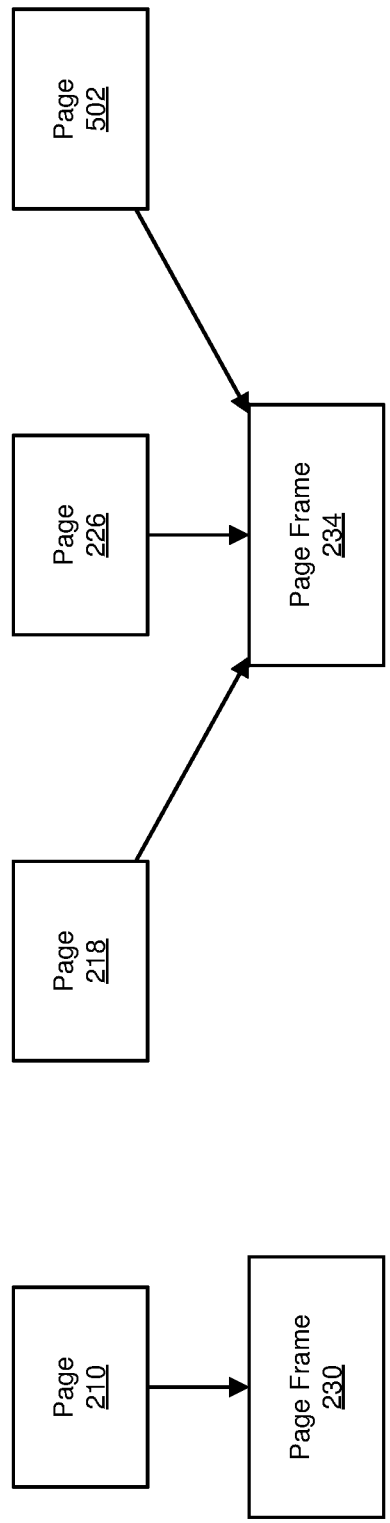
FIG. 7 is a block diagram of an additional example mapping of virtual memory pages to physical memory.

In some examples, a virtual machine's trustworthiness score may be updated, and the virtual machine may be reassigned to a different trust group as a result. Using FIGS. 4 and 6 as an example, virtual machine 212 may be reassigned to semi-trusted group 120 after the trustworthiness score of virtual machine 212 is updated to a value that no longer falls within the range associated with trusted group 118 but that instead falls within the range associated with semi-trusted group 120. In situations where a virtual machine has been removed from an old trust group and reassigned to a new trust group, de-duplicating module 110 may update the mappings of the virtual machine's virtual memory so that the virtual machine no longer shares any physical memory with the virtual machines in the old trust group but does share physical memory with the virtual machines in the new trust group where possible. FIG. 7 illustrates how de-duplicating module 110 may remap the virtual memory of virtual machine 220 after virtual machine 220 has been removed from trusted group 118 and reassigned to semi-trusted group 120. In this example, de-duplicating module 110 may allow page 218 of virtual machine 220 to share page frame 234 with virtual machines 220 and 404 by remapping page 218 to page frame 234 since virtual machines 212, 220, and 404 now all belong to semi-trusted group 120.

Figure 10:
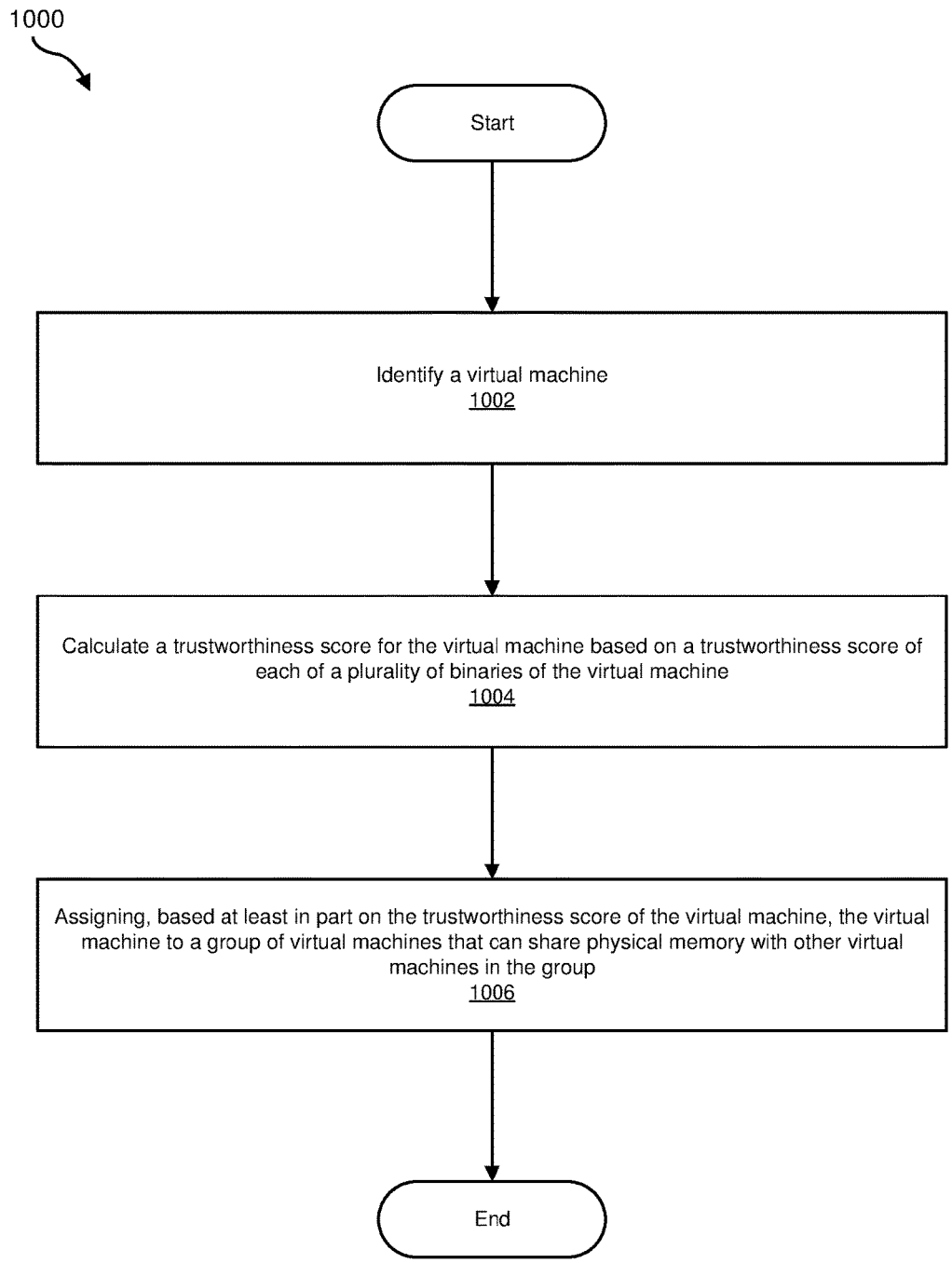
FIG. 10 is a flow diagram of an example method for enabling safe memory de-duplication in shared-computing environments.
Figure 11:
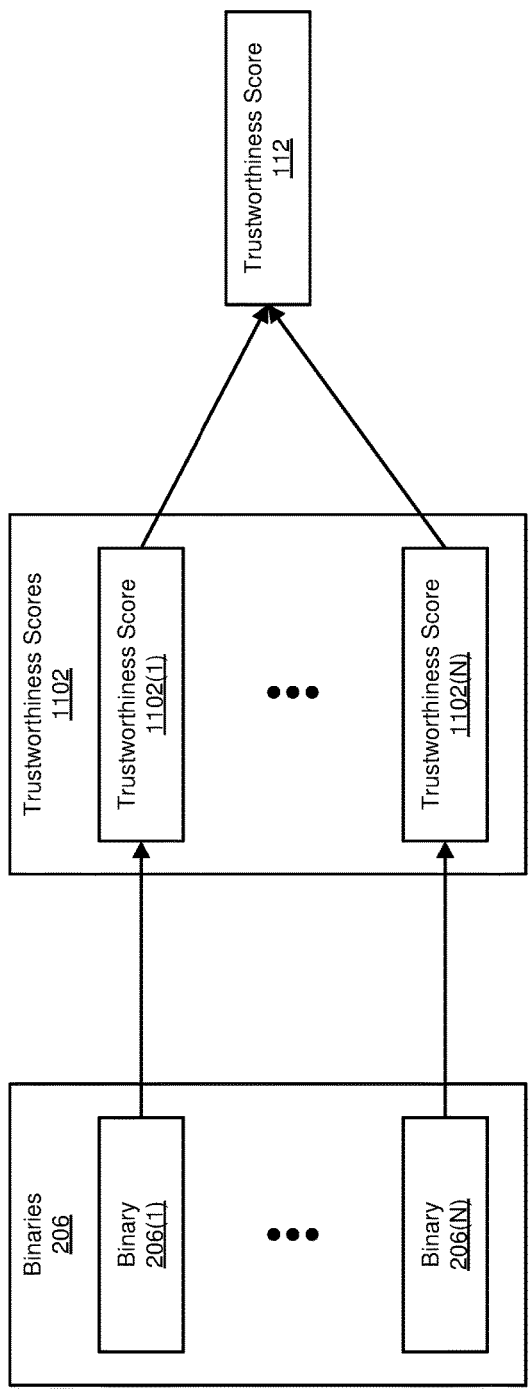
FIG. 11 is a flow diagram of an example method for calculating trustworthiness scores.

The systems described herein may assign virtual machines to trust groups in a variety of ways. FIG. 10 is a flow diagram of an example computer-implemented method 1000 for enabling safe memory de-duplication in shared-computing environments. The steps shown in FIG. 10 may be performed by any suitable computer-executable code and/or computing system, including system 100 in FIG. 1, system 200 in FIG. 2, and/or variations or combinations of one or more of the same. In one example, each of the steps shown in FIG. 10 may represent an algorithm whose structure includes and/or is represented by multiple sub-steps, examples of which will be provided in greater detail below.

As illustrated in FIG. 10, at step 1002 one or more of the systems described herein may identify a virtual machine. For example, identifying module 104 may, as part of computing device 202 in FIG. 2, identify virtual machine 204, virtual machine 212, and virtual machine 220.

The systems described herein may identify virtual machines in any suitable manner. In some examples, identifying module 104 may identify virtual machines as part of a hypervisor that hosts the virtual machines. Additionally or alternatively, identifying module 104 may identify virtual machines as part of an extension of the hypervisor that manages the virtual memory of the virtual machines.

In some examples, identifying module 104 may identify a virtual machine when it is executed by the hypervisor. Additionally or alternatively, identifying module 104 may identify virtual machines as part of a cloud-based platform that provisions virtual machines. In such examples, identifying module 104 may identify a virtual machine as it is provisioned or while its image is stored in the cloud-based platform. In at least one example, identifying module 104 may identify a virtual machine as part of an in-host agent that is executed within the virtual machine.

As part of identifying a virtual machine, identifying module 104 may also identify some or all of a virtual machine's binaries (e.g., binary files or executables) that may be stored on or executed by the virtual machine. For example, identifying module 104 may identify binaries 206 of virtual machine 204, binaries 214 of virtual machine 212, and binaries 222 of virtual machine 220. Identifying module 104 may identify the binaries of a virtual machine before and/or while the virtual machine is running. In at least one example, identifying module 104 may periodically and/or continually monitor the virtual machine for additional binaries that may be added to or removed from the virtual machine. In this way, identifying module 104 may maintain an up-to-date list of a virtual machine's binaries.

At step 1004, one or more of the systems described herein may calculate a trustworthiness score for the virtual machine based on a trustworthiness score of each of a plurality of binaries of the virtual machine. For example, calculating module 106 may, as part of computing device 202 in FIG. 2, calculate a trustworthiness score 112 for virtual machine 204 based on a trustworthiness score of each of binaries 206, a trustworthiness score 114 for virtual machine 212 based on a trustworthiness score of each of binaries 214, and a trustworthiness score 116 for virtual machine 220 based on a trustworthiness score of each of binaries 222.

The term "trustworthiness score," as used herein, generally refers to any type or form of information used to indicate or identify the trustworthiness or reputation of an object (such as a file, executable file, application, virtual machine, etc.) within a community (such as the user base of a security-software vendor). A trustworthiness score may indicate that a particular object is trustworthy or untrustworthy. Alternatively, a trustworthiness score may indicate that the trustworthiness of a particular object is unknown. In various examples, trustworthiness scores assigned to objects may indicate that the objects are untrustworthy even though the objects are not known to be malicious. In some examples, a trustworthiness score may be represented by a numeric value that represents a level of an object's trustworthiness or reputation (for example, 99% or 0% trustworthy). In some examples, a high trustworthiness score may indicate that an object is generally trusted, and a low trustworthiness score may indicate that an object is generally untrusted.

The systems described herein may calculate trustworthiness scores for virtual machines in any suitable manner. In general, calculating module 106 may calculate a trustworthiness score for a virtual machine by (i) identifying a trustworthiness score for each of the virtual machine's binaries and (ii) deriving an aggregate or overall trustworthiness score for the virtual machine that reflects the trustworthiness and/or untrustworthiness of the virtual machine's binaries. Using FIG. 11 as an example, calculating module 106 may calculate trustworthiness score 112 for virtual machine 204 by (i) identifying trustworthiness scores 1102 that include a trustworthiness score for each of binaries 206(1)-(N) of virtual machine 204 (e.g., trustworthiness score 1102(1) may represent the trustworthiness score of binary 206(1)) and (ii) deriving trustworthiness score 112 from an aggregation of trustworthiness scores 1102.

Calculating module 106 may aggregate the trustworthiness scores of a virtual machine's binaries into a trustworthiness score for the virtual machine in any suitable manner that reflects the trustworthiness and/or untrustworthiness of the virtual machine's binaries. In one example, calculating module 106 may derive an aggregate or overall trustworthiness score for a virtual machine by applying banding logic to the trustworthiness scores of the virtual machine's binaries. In some examples, calculating module 106 may calculate a trustworthiness score for a virtual machine by averaging the trustworthiness scores of the virtual machine's binaries. In another example, calculating module 106 may calculate a trustworthiness score for a virtual machine by assigning a trustworthiness score to the virtual machine that is equal to the trustworthiness score of the virtual machine's least trusted binary or an average of the trustworthiness scores of the virtual machine's least trusted binaries.

In some examples, a binary may be removed from or added to a virtual machine. As such, calculating module 106 may update a trustworthiness score of a virtual machine in response to any changes to the binaries it contains. In other examples, a trustworthiness score of a binary may be updated. As such, calculating module 106 may periodically update a trustworthiness score of a virtual machine so that it reflects the most up-to-date trustworthiness scores of its binaries.

At step 1006, one or more of the systems described herein may assign, based on the trustworthiness score of the virtual machine, the virtual machine to a group of virtual machines that can share physical memory with other virtual machines in the group. For example, assigning module 108 may, as part of computing device 202 in FIG. 2, assign virtual machines 204, 212, and 220 to one of trusted group 118, semi-trusted group 120, or untrusted group 122 based on the respective trustworthiness scores of virtual machines 204, 212, and 220 (e.g., as shown in FIGS. 4, 6, and 8).

The systems described herein may assign virtual machines to trust groups in any suitable manner. In general, assigning module 108 may assign virtual machines with the same or similar trustworthiness scores to a group of virtual machines whose members may share page frames in physical memory. In some examples, assigning module 108 may assign virtual machines whose trustworthiness scores fall within a particular range to a group associated with the range. Assigning module 108 may assign virtual machines to groups using ranges with various degrees of granularity. In one example, assigning module 108 may assign virtual machines to one of two groups (e.g., a trusted group and an untrusted group). For example, assigning module 108 may assign virtual machines whose trustworthiness scores fall below a particular threshold value range to the untrusted group and may assign virtual machines whose trustworthiness scores are above the particular threshold value range to the trusted group.

In another example, assigning module 108 may assign virtual machines to one of three groups (e.g., a trusted group, a semi-trusted group, and an untrusted group). For example, assigning module 108 may assign virtual machines whose trustworthiness scores fall within a lowest range to an untrusted group, virtual machines whose trustworthiness scores fall within an intermediate range to a semi-trusted group, and virtual machines whose trustworthiness scores fall within a highest range to a trusted group. In yet another example, assigning module 108 may assign virtual machines to one of five groups (e.g., a fully trusted group, a highly trusted group, an untrusted group, a highly untrusted group, and a fully untrusted group) each with an associated range of trustworthiness scores.

Using FIG. 4 as an example, assigning module 108 may assign virtual machines 204 and 212 whose trustworthiness scores fall within a highest range to trusted group 118 and may assign virtual machines 220 and 404 whose trustworthiness scores fall within an intermediate range to semi-trusted group 120. Using FIG. 8 as another example, assigning module 108 may assign virtual machines 204 and 212 whose trustworthiness scores fall within a highest range to trusted group 118 and may assign virtual machines 220 whose trustworthiness scores fall within a lowest range to untrusted group 122.

As mentioned above, a virtual machine's trustworthiness score may be periodically updated to reflect changes to the binaries of the virtual machine and/or to reflect changes to the trustworthiness scores of the binaries of the virtual machine. If the trustworthiness score of a virtual machine changes significantly enough that the trustworthiness score no longer qualifies the virtual machine to belong to a particular group of virtual machines, assigning module 108 may reassign the virtual machine to the appropriate trust group. For example, if the trustworthiness score of a virtual machine significantly improves, assigning module 108 may reassign the virtual machine to a more trusted group. Similarly, if the trustworthiness score of the virtual machine significantly declines, assigning module 108 may reassign the virtual machine to a less trusted group. Using FIGS. 4 and 6 as an example, assigning module 108 may reassign virtual machine 212 to semi-trusted group 120 after the trustworthiness score of virtual machine 212 is updated to a value that no longer falls within the highest range associated with trusted group 118 but that instead falls within the intermediate range associated with semi-trusted group 120.

The systems and methods disclosed herein may assign virtual machines to groups in any way that enables a de-duplication system to determine which virtual machines belong to the same group and/or in any way that enables the de-duplication system to determine that two page frames that belong to virtual machines within the same group are eligible for memory de-duplication. In some examples, the systems and methods disclosed herein may associate a salt value (e.g., a globally unique identifier (GUID)) with a trusted or semi-trusted group of virtual machines. For example, a group salt 402 may be assigned to trusted group 118 as shown in FIG. 4, and a group salt 406 may be assigned to semi-trusted group 120 as shown in FIG. 4. In some examples, a group's salt value may be associated with each page frame that backs a page of virtual memory of a virtual machine in the group. When a de-duplication system identifies two page frames in physical memory that contain the same data, the de-duplication system may de-duplicate the page frames only if the salt values that are associated with the page frames match. In at least one example, the salt value that is associated with a group may be written to each page frame that backs a page of virtual memory of a virtual machine in the group, in this way only page frames that contain the same data and the same salt value will be identical. In this example a de-duplication system may de-duplicate any page frames in physical memory that contain identical data.

In some examples, the systems and methods disclosed herein may associate a group salt value (e.g., globally unique identifier (GUID)) with a group of virtual machines regardless of whether the group is trusted or untrusted and another consumer salt value with the virtual machines of a particular consumer. In these examples, a group's salt value may be associated with each page frame that backs a page of virtual memory of a virtual machine in the group, and a consumer's salt value may be associated with each page frame that backs a page of virtual memory of a virtual machine that belongs to the consumer. In these examples, when a de-duplication system identifies two page frames in physical memory that contain the same data, the de-duplication system may de-duplicate the page frames only if the group salt values that are associated with the page frames match and the consumer salt values that are associated with the page frames match. Upon completion of step 1108, exemplary method 1100 in FIG. 11 may terminate.

As explained above, by determining which virtual machines in shared-computing environments are trustworthy and which are untrustworthy based on the trustworthiness of the virtual machines' binaries, the systems and methods described herein may enable safe memory de-duplication amongst trustworthy virtual machines and/or prevent untrustworthy virtual machines from sharing physical memory with other virtual machines. By enabling trustworthy virtual machines to share physical memory while preventing untrustworthy virtual machines from sharing physical memory with other virtual machines, the systems and methods described herein may prevent the untrusted virtual machines from perpetrating rowhammer attacks.

Figure 12:
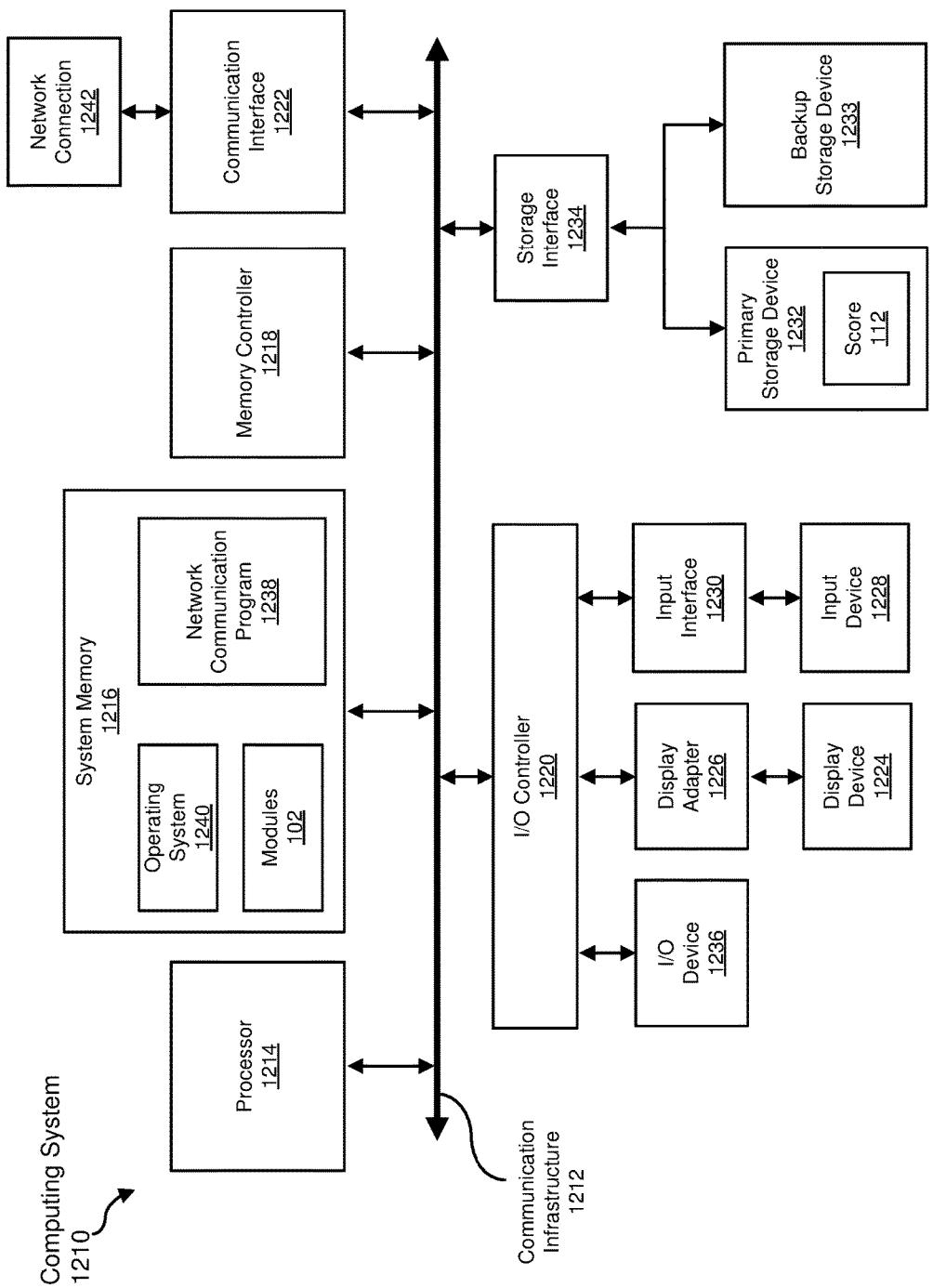
FIG. 12 is a block diagram of an example computing system capable of implementing one or more of the embodiments described and/or illustrated herein.

FIG. 12 is a block diagram of an example computing system 1210 capable of implementing one or more of the embodiments described and/or illustrated herein. For example, all or a portion of computing system 1210 may perform and/or be a means for performing, either alone or in combination with other elements, one or more of the steps described herein (such as one or more of the steps illustrated in FIG. 10). All or a portion of computing system 1210 may also perform and/or be a means for performing any other steps, methods, or processes described and/or illustrated herein.

Computing system 1210 broadly represents any single or multi-processor computing device or system capable of executing computer-readable instructions. Examples of computing system 1210 include, without limitation, workstations, laptops, client-side terminals, servers, distributed computing systems, handheld devices, or any other computing system or device. In its most basic configuration, computing system 1210 may include at least one processor 1214 and a system memory 1216.

Processor 1214 generally represents any type or form of physical processing unit (e.g., a hardware-implemented central processing unit) capable of processing data or interpreting and executing instructions. In certain embodiments, processor 1214 may receive instructions from a software application or module. These instructions may cause processor 1214 to perform the functions of one or more of the example embodiments described and/or illustrated herein.

System memory 1216 generally represents any type or form of volatile or non-volatile storage device or medium capable of storing data and/or other computer-readable instructions. Examples of system memory 1216 include, without limitation, Random Access Memory (RAM), Read Only Memory (ROM), flash memory, or any other suitable memory device. Although not required, in certain embodiments computing system 1210 may include both a volatile memory unit (such as, for example, system memory 1216) and a non-volatile storage device (such as, for example, primary storage device 1232, as described in detail below). In one example, one or more of modules 102 from FIG. 1 may be loaded into system memory 1216.

In some examples, system memory 1216 may store and/or load an operating system 1240 for execution by processor 1214. In one example, operating system 1240 may include and/or represent software that manages computer hardware and software resources and/or provides common services to computer programs and/or applications on computing system 1210. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1210 may also include one or more components or elements in addition to processor 1214 and system memory 1216. For example, as illustrated in FIG. 12, computing system 1210 may include a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI Express (PCIe), or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234.

As illustrated in FIG. 12, computing system 1210 may also include at least one display device 1224 coupled to I/O controller 1220 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer, as known in the art) for display on display device 1224.

As illustrated in FIG. 12, example computing system 1210 may also include at least one input device 1228 coupled to I/O controller 1220 via an input interface 1230. Input device 1228 generally represents any type or form of input device capable of providing input, either computer or human generated, to example computing system 1210. Examples of input device 1228 include, without limitation, a keyboard, a pointing device, a speech recognition device, variations or combinations of one or more of the same, and/or any other input device.

Additionally or alternatively, example computing system 1210 may include additional I/O devices. For example, example computing system 1210 may include I/O device 1236. In this example, I/O device 1236 may include and/or represent a user interface that facilitates human interaction with computing system 1210. Examples of I/O device 1236 include, without limitation, a computer mouse, a keyboard, a monitor, a printer, a modem, a camera, a scanner, a microphone, a touchscreen device, variations or combinations of one or more of the same, and/or any other I/O device.

Communication interface 1222 broadly represents any type or form of communication device or adapter capable of facilitating communication between example computing system 1210 and one or more additional devices. For example, in certain embodiments communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1222 may also allow computing system 1210 to engage in distributed or remote computing. For example, communication interface 1222 may receive instructions from a remote device or send instructions to a remote device for execution.

In some examples, system memory 1216 may store and/or load a network communication program 1238 for execution by processor 1214. In one example, network communication program 1238 may include and/or represent software that enables computing system 1210 to establish a network connection 1242 with another computing system (not illustrated in FIG. 12) and/or communicate with the other computing system by way of communication interface 1222. In this example, network communication program 1238 may direct the flow of outgoing traffic that is sent to the other computing system via network connection 1242. Additionally or alternatively, network communication program 1238 may direct the processing of incoming traffic that is received from the other computing system via network connection 1242 in connection with processor 1214.

Although not illustrated in this way in FIG. 12, network communication program 1238 may alternatively be stored and/or loaded in communication interface 1222. For example, network communication program 1238 may include and/or represent at least a portion of software and/or firmware that is executed by a processor and/or Application Specific Integrated Circuit (ASIC) incorporated in communication interface 1222.

As illustrated in FIG. 12, example computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a solid state drive, a floppy disk drive, a magnetic tape drive, an optical disk drive, a flash drive, or the like. Storage interface 1234 generally represents any type or form of interface or device for transferring data between storage devices 1232 and 1233 and other components of computing system 1210. In one example, one or more trustworthiness scores (e.g., trustworthiness score 112 from FIG. 1) may be stored and/or loaded in primary storage device 1232.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

Many other devices or subsystems may be connected to computing system 1210. Conversely, all of the components and devices illustrated in FIG. 12 need not be present to practice the embodiments described and/or illustrated herein. The devices and subsystems referenced above may also be interconnected in different ways from that shown in FIG. 12. Computing system 1210 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1210 may be configured as an Application Specific Integrated Circuit (ASIC) adapted to implement one or more of the example embodiments disclosed herein.

Figure 13:
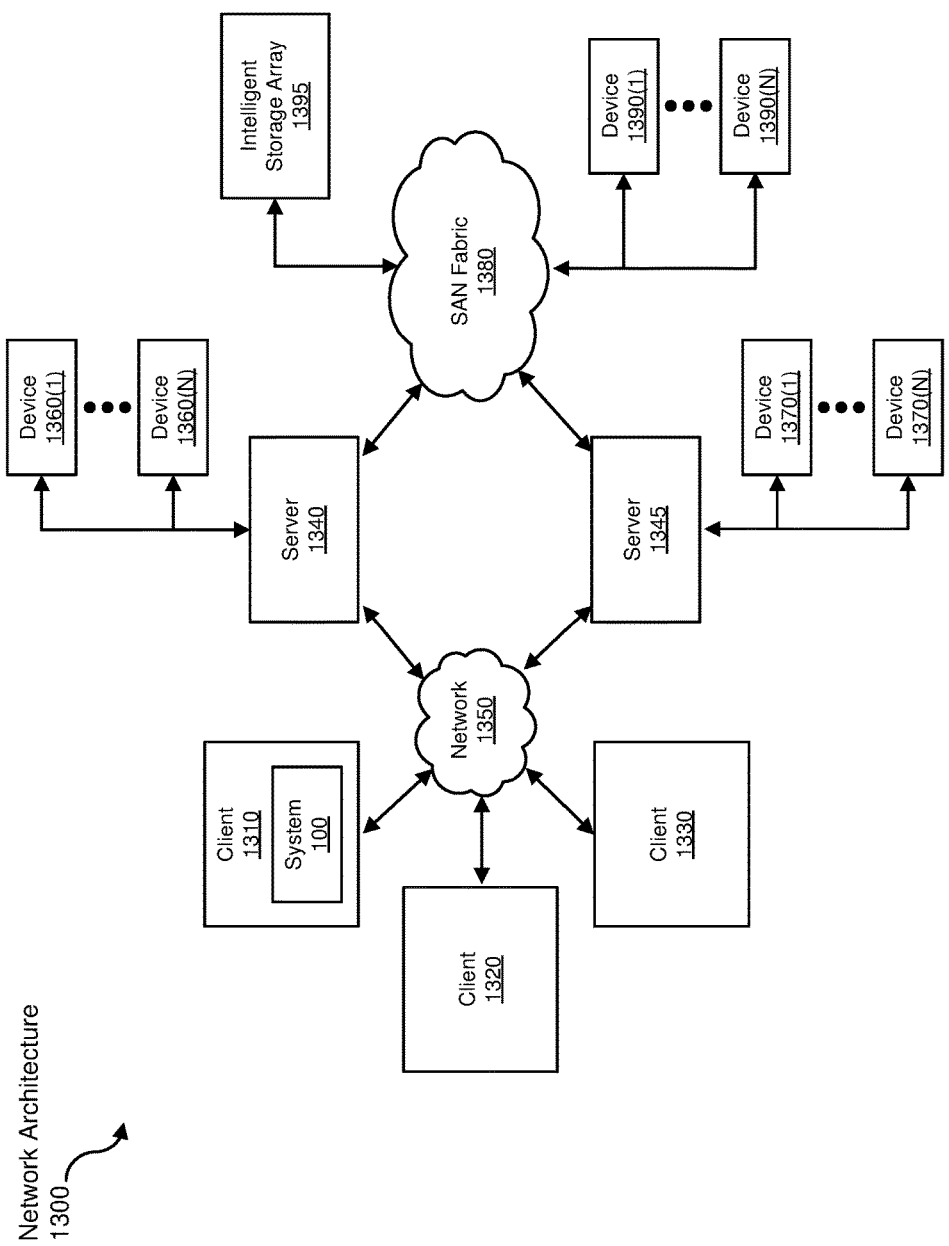
FIG. 13 is a block diagram of an example computing network capable of implementing one or more of the embodiments described and/or illustrated herein.

FIG. 13 is a block diagram of an example network architecture 1300 in which client systems 1310, 1320, and 1330 and servers 1340 and 1345 may be coupled to a network 1350. As detailed above, all or a portion of network architecture 1300 may perform and/or be a means for performing, either alone or in combination with other elements, one or more of the steps disclosed herein (such as one or more of the steps illustrated in FIG. 10). All or a portion of network architecture 1300 may also be used to perform and/or be a means for performing other steps and features set forth in the instant disclosure.

Client systems 1310, 1320, and 1330 generally represent any type or form of computing device or system, such as example computing system 1210 in FIG. 12. Similarly, servers 1340 and 1345 generally represent computing devices or systems, such as application servers or database servers, configured to provide various database services and/or run certain software applications. Network 1350 generally represents any telecommunication or computer network including, for example, an intranet, a WAN, a LAN, a PAN, or the Internet. In one example, client systems 1310, 1320, and/or 1330 and/or servers 1340 and/or 1345 may include all or a portion of system 100 from FIG. 1.

As illustrated in FIG. 13, one or more storage devices 1360(1)-(N) may be directly attached to server 1340. Similarly, one or more storage devices 1370(1)-(N) may be directly attached to server 1345. Storage devices 1360(1)-(N) and storage devices 1370(1)-(N) generally represent any type or form of storage device or medium capable of storing data and/or other computer-readable instructions. In certain embodiments, storage devices 1360(1)-(N) and storage devices 1370(1)-(N) may represent Network-Attached Storage (NAS) devices configured to communicate with servers 1340 and 1345 using various protocols, such as Network File System (NFS), Server Message Block (SMB), or Common Internet File System (CIFS).

Servers 1340 and 1345 may also be connected to a Storage Area Network (SAN) fabric 1380. SAN fabric 1380 generally represents any type or form of computer network or architecture capable of facilitating communication between a plurality of storage devices. SAN fabric 1380 may facilitate communication between servers 1340 and 1345 and a plurality of storage devices 1390(1)-(N) and/or an intelligent storage array 1395. SAN fabric 1380 may also facilitate, via network 1350 and servers 1340 and 1345, communication between client systems 1310, 1320, and 1330 and storage devices 1390(1)-(N) and/or intelligent storage array 1395 in such a manner that devices 1390(1)-(N) and array 1395 appear as locally attached devices to client systems 1310, 1320, and 1330. As with storage devices 1360(1)-(N) and storage devices 1370(1)-(N), storage devices 1390(1)-(N) and intelligent storage array 1395 generally represent any type or form of storage device or medium capable of storing data and/or other computer-readable instructions.

In certain embodiments, and with reference to example computing system 1210 of FIG. 12, a communication interface, such as communication interface 1222 in FIG. 12, may be used to provide connectivity between each client system 1310, 1320, and 1330 and network 1350. Client systems 1310, 1320, and 1330 may be able to access information on server 1340 or 1345 using, for example, a web browser or other client software. Such software may allow client systems 1310, 1320, and 1330 to access data hosted by server 1340, server 1345, storage devices 1360(1)-(N), storage devices 1370(1)-(N), storage devices 1390(1)-(N), or intelligent storage array 1395. Although FIG. 13 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1340, server 1345, storage devices 1360(1)-(N), storage devices 1370(1)-(N), storage devices 1390(1)-(N), intelligent storage array 1395, or any combination thereof. All or a portion of one or more of the example embodiments disclosed herein may also be encoded as a computer program, stored in server 1340, run by server 1345, and distributed to client systems 1310, 1320, and 1330 over network 1350.

As detailed above, computing system 1210 and/or one or more components of network architecture 1300 may perform and/or be a means for performing, either alone or in combination with other elements, one or more steps of an example method for enabling safe memory de-duplication in shared-computing environments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a trustworthiness score of each of a virtual machine's binaries to be transformed, transform the trustworthiness scores into a trustworthiness score for the virtual machine, output a result of the transformation to a de-duplication module that de-duplicates virtual-machine memory in shared-computing environments, use the result of the transformation to de-duplicate the memory of two or more trusted virtual machines, and store the result of the transformation to a system for storing virtual-machine trustworthiness scores. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling safe memory de-duplication in shared-computing environments, at least a portion of the method being performed by a computing device comprising at least one processor, the method comprising:

identifying a first virtual machine and a second virtual machine;

calculating a trustworthiness score for the first virtual machine based at least in part on a trustworthiness score of each of a plurality of binaries of the first virtual machine;

calculating a trustworthiness score for the second virtual machine based at least in part on a trustworthiness score of each of a plurality of binaries of the second virtual machine;

enabling a page of virtual memory of the first virtual machine and a page of virtual memory of the second virtual machine to share a page frame of physical memory by:

assigning, based at least in part on the trustworthiness score of the first virtual machine being above a predetermined threshold, the first virtual machine to a trusted group of virtual machines that can share physical memory; and assigning, based at least in part on the trustworthiness score of the second virtual machine being above the predetermined threshold, the second virtual machine to the trusted group;

determining that the page of virtual memory of the first virtual machine and the page of virtual memory of the second virtual machine contain identical data;

determining that the first virtual machine and the second virtual machine have been assigned to the trusted group; and mapping, in response to determining that the first virtual machine and the second virtual machine have been assigned to the trusted group, the page of virtual memory of the first virtual machine and the page of virtual memory of the second virtual machine to the page frame of physical memory.

2. The computer-implemented method of claim 1, further comprising:

identifying a third virtual machine;

calculating a trustworthiness score for the third virtual machine based at least in part on a trustworthiness score of each of a plurality of binaries of the third virtual machine; and preventing a page of virtual memory of the third virtual machine from being mapped to the page frame of physical memory by refraining, based at least in part on the trustworthiness score of the third virtual machine being below the predetermined threshold, from assigning the third virtual machine to the trusted group.

3. The computer-implemented method of claim 2, further comprising:

updating, based at least in part on a change to the plurality of binaries of the third virtual machine, the trustworthiness score of the third virtual machine;

determining, after updating the trustworthiness score of the third virtual machine, that the trustworthiness score of the third virtual machine has risen above the predetermined threshold; and enabling virtual memory pages of the third virtual machine to share physical memory with other virtual machines in the trusted group by assigning, based at least in part on the trustworthiness score of the third virtual machine being above the predetermined threshold, the third virtual machine to the trusted group.

4. The computer-implemented method of claim 2, further comprising assigning, based at least in part on the trustworthiness score of the third virtual machine being above a second predetermined threshold, the third virtual machine to a semi-trusted group of virtual machines that can share physical memory with other virtual machines in the semi-trusted group.

5. The computer-implemented method of claim 2, further comprising assigning, based at least in part on the trustworthiness score of the third virtual machine being below a second predetermined threshold, the third virtual machine to an untrusted group of virtual machines that cannot share physical memory with any other virtual machine.

6. The computer-implemented method of claim 1, further comprising:

updating, based at least in part on a change to the plurality of binaries of the first virtual machine, the trustworthiness score of the first virtual machine;

determining, after updating the trustworthiness score of the first virtual machine, that the trustworthiness score of the first virtual machine has fallen below the predetermined threshold; and preventing the page of virtual memory of the first virtual machine from sharing the page frame of physical memory with any virtual machine in the trusted group by removing, based at least in part on the trustworthiness score of the first virtual machine being below the predetermined threshold, the first virtual machine from the trusted group.

7. The computer-implemented method of claim 6, further comprising mapping, after removing the first virtual machine from the trusted group, the page of virtual memory of the first virtual machine to a duplicated page frame of physical memory.

8. The computer-implemented method of claim 1, further comprising assigning a unique salt value to the trusted group, wherein:

assigning the first virtual machine to the trusted group comprises assigning the unique salt value to the first virtual machine to indicate to a hypervisor that the hypervisor can share physical memory between the first virtual machine and any other virtual machine to which the unique salt value has also been assigned; and assigning the second virtual machine to the trusted group comprises assigning the unique salt value to the second virtual machine to indicate to the hypervisor that the hypervisor can share physical memory between the second virtual machine and any other virtual machine to which the unique salt value has also been assigned.

9. The computer-implemented method of claim 1, wherein the first virtual machine and the second virtual machine belong to the same consumer.

10. The computer-implemented method of claim 1, wherein the first virtual machine and the second virtual machine belong to different consumers.

11. A system for enabling safe memory de-duplication in shared-computing environments, the system comprising:

an identifying module, stored in memory, that identifies a first virtual machine and a second virtual machine;

a calculating module, stored in memory, that:

calculates a trustworthiness score for the first virtual machine based at least in part on a trustworthiness score of each of a plurality of binaries of the first virtual machine; and calculates a trustworthiness score for the second virtual machine based at least in part on a trustworthiness score of each of a plurality of binaries of the second virtual machine;

an assigning module, stored in memory, that enables a page of virtual memory of the first virtual machine and a page of virtual memory of the second virtual machine to share a page frame of physical memory by:

assigning, based at least in part on the trustworthiness score of the first virtual machine being above a predetermined threshold, the first virtual machine to a trusted group of virtual machines that can share physical memory; and assigning, based at least in part on the trustworthiness score of the second virtual machine being above the predetermined threshold, the second virtual machine to the trusted group;

a de-duplicating module, stored in memory, that:

determines that the page of virtual memory of the first virtual machine and the page of virtual memory of the second virtual machine contain identical data;

determines that the first virtual machine and the second virtual machine have been assigned to the trusted group; and maps, in response to determining that the first virtual machine and the second virtual machine have been assigned to the trusted group, the page of virtual memory of the first virtual machine and the page of virtual memory of the second virtual machine to the page frame of physical memory; and at least one physical processor that executes the identifying module, the calculating module, and the assigning module.

12. The system of claim 11, wherein:

the identifying module further identifies a third virtual machine;

the calculating module further calculates a trustworthiness score for the third virtual machine based at least in part on a trustworthiness score of each of a plurality of binaries of the third virtual machine; and the assigning module further prevents a page of virtual memory of the third virtual machine from being mapped to the page frame of physical memory by refraining, based at least in part on the trustworthiness score of the third virtual machine being below the predetermined threshold, from assigning the third virtual machine to the trusted group.

13. The system of claim 12, wherein:

the calculating module further updates, based at least in part on a change to the plurality of binaries of the third virtual machine, the trustworthiness score of the third virtual machine; and the assigning module further:

determines, after the trustworthiness score of the third virtual machine is updated, that the trustworthiness score of the third virtual machine has risen above the predetermined threshold; and enables virtual memory pages of the third virtual machine to share physical memory with other virtual machines in the trusted group by assigning, based at least in part on the trustworthiness score of the third virtual machine being above the predetermined threshold, the third virtual machine to the trusted group.

14. The system of claim 12, wherein the assigning module further assigns, based at least in part on the trustworthiness score of the third virtual machine being above a second predetermined threshold, the third virtual machine to a semi-trusted group of virtual machines that can share physical memory with other virtual machines in the semi-trusted group.

15. The system of claim 12, wherein the assigning module further assigns, based at least in part on the trustworthiness score of the third virtual machine being below a second predetermined threshold, the third virtual machine to an untrusted group of virtual machines that cannot share physical memory with any other virtual machine.

16. The system of claim 11, wherein:

the calculating module further updates, based at least in part on a change to the plurality of binaries of the first virtual machine, the trustworthiness score of the first virtual machine; and the assigning module further:

determines, after the trustworthiness score of the first virtual machine is updated, that the trustworthiness score of the first virtual machine has fallen below the predetermined threshold; and prevents the page of virtual memory of the first virtual machine from sharing the page frame of physical memory with any virtual machine in the trusted group by removing, based at least in part on the trustworthiness score of the first virtual machine being below the predetermined threshold, the first virtual machine from the trusted group.

17. The system of claim 16, further comprising a de-duplicating module, stored in memory, that maps, after the first virtual machine is removed from the trusted group, the page of virtual memory of the first virtual machine to a duplicated page frame of physical memory.

18. A non-transitory computer-readable medium comprising one or more computer-executable instructions that, when executed by at least one processor of a computing device, cause the computing device to:

identify a first virtual machine and a second virtual machine;

calculate a trustworthiness score for the first virtual machine based at least in part on a trustworthiness score of each of a plurality of binaries of the first virtual machine;

calculate a trustworthiness score for the second virtual machine based at least in part on a trustworthiness score of each of a plurality of binaries of the second virtual machine;

enable a page of virtual memory of the first virtual machine and a page of virtual memory of the second virtual machine to share a page frame of physical memory by:

assigning, based at least in part on the trustworthiness score of the first virtual machine being above a predetermined threshold, the first virtual machine to a trusted group of virtual machines that can share physical memory; and assigning, based at least in part on the trustworthiness score of the second virtual machine being above the predetermined threshold, the second virtual machine to the trusted group;

determine that the page of virtual memory of the first virtual machine and the page of virtual memory of the second virtual machine contain identical data;

determine that the first virtual machine and the second virtual machine have been assigned to the trusted group; and map, in response to determining that the first virtual machine and the second virtual machine have been assigned to the trusted group, the page of virtual memory of the first virtual machine and the page of virtual memory of the second virtual machine to the page frame of physical memory.

* * * * *